(12) United States Patent
Steele et al.

(10) Patent No.: US 8,631,584 B2
(45) Date of Patent: *Jan. 21, 2014

(54) LEVEL

(71) Applicant: Milwaukee Electric Tool Corporation, Brookfield, WI (US)

(72) Inventors: Michael S. Steele, Waukesha, WI (US); Wade F. Burch, Wauwatosa, WI (US); Timothy Albrecht, Menomonee Falls, WI (US); Michael W. Phillips, Milwaukee, WI (US); Brandon Miller, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/720,268

(22) Filed: Dec. 19, 2012

(65) Prior Publication Data

US 2013/0152414 A1 Jun. 20, 2013

Related U.S. Application Data

(63) Continuation of application No. 12/912,443, filed on Oct. 26, 2010, now Pat. No. 8,336,221.

(60) Provisional application No. 61/255,357, filed on Oct. 27, 2009, provisional application No. 61/330,773, filed on May 3, 2010.

(51) Int. Cl.
*G01C 9/02* (2006.01)

(52) U.S. Cl.
USPC ............... 33/528; 33/354; 33/371; 33/382; 33/390; 33/451; 33/DIG. 10

(58) Field of Classification Search
USPC ............... 33/528, 354, 371, 382, 390, 451, 33/DIG. 10
See application file for complete search history.

(56) References Cited

U.S. PATENT DOCUMENTS

| 232,982 A | 10/1880 | Langdon |
| 675,464 A | 6/1901 | Carlson |

(Continued)

FOREIGN PATENT DOCUMENTS

| EP | 1225671 | 7/2002 |
| EP | 2056065 | 5/2009 |

(Continued)

OTHER PUBLICATIONS

United Kingdom Search and Examination Report, Feb. 21, 2011, Application No. GB1018187.3, (8 pages).

(Continued)

*Primary Examiner* — Christopher Fulton
(74) *Attorney, Agent, or Firm* — Michael Best & Friedrich LLP

(57) ABSTRACT

A level for indicating the orientation of a surface includes a first planar surface, a second planar surface, and a web coupled to the first planar surface and the second planar surface such that the first planar surface is spaced apart from and is parallel to the second planar surface. A vial defines a long axis and contains a liquid and a gas bubble. The vial is coupled to the web such that the long axis is substantially parallel to the first planar surface. A tube deburring portion is coupled to the web and includes a male conical portion arranged to deburr an inner edge of a tube and a female conical portion arranged to deburr an outer edge of the tube.

21 Claims, 11 Drawing Sheets

(56) References Cited

U.S. PATENT DOCUMENTS

| | | |
|---|---|---|
| 730,790 A | 6/1903 | Newman |
| 2,535,791 A | 12/1950 | Fluke |
| 2,634,509 A | 4/1953 | Roberts |
| 2,695,949 A | 11/1954 | Ashwill |
| 2,789,363 A | 4/1957 | Miley |
| 3,116,563 A | 1/1964 | Gelbman |
| 3,213,545 A | 10/1965 | Wright |
| 3,279,080 A | 10/1966 | Stepshinski |
| 3,832,782 A | 9/1974 | Johnson et al. |
| 4,099,331 A | 7/1978 | Peterson et al. |
| 4,126,944 A | 11/1978 | Burkhart |
| D261,369 S | 10/1981 | Smith |
| 4,338,725 A | 7/1982 | Martin et al. |
| 4,407,075 A | 10/1983 | MacDermott et al. |
| 4,593,475 A | 6/1986 | Mayes |
| 4,793,069 A | 12/1988 | McDowell |
| D301,553 S | 6/1989 | Makofsky et al. |
| 4,888,880 A | 12/1989 | Parker |
| 5,199,177 A | 4/1993 | Hutchins et al. |
| D337,279 S | 7/1993 | Styles et al. |
| 5,379,524 A * | 1/1995 | Dawson ................ 33/768 |
| 5,505,001 A | 4/1996 | Schaver, Jr. |
| 5,535,523 A | 7/1996 | Endris |
| 5,749,152 A | 5/1998 | Goss et al. |
| 5,755,037 A | 5/1998 | Stevens |
| 5,813,130 A | 9/1998 | MacDowell |
| 6,003,234 A | 12/1999 | Seibert |
| 6,029,360 A | 2/2000 | Koch |
| 6,070,336 A | 6/2000 | Rodgers |
| 6,173,502 B1 | 1/2001 | Scarborough |
| 6,568,095 B2 | 5/2003 | Snyder |
| 6,675,490 B1 | 1/2004 | Krehel et al. |
| 6,732,441 B2 | 5/2004 | Charay et al. |
| 6,782,628 B2 | 8/2004 | Liao |
| 6,818,824 B1 | 11/2004 | Marcou et al. |
| 6,839,973 B1 | 1/2005 | Woodward |
| 7,089,676 B2 | 8/2006 | Godinez |
| 7,152,335 B2 | 12/2006 | Nichols |
| 7,204,029 B2 | 4/2007 | Tran et al. |
| 7,316,074 B2 | 1/2008 | Tran et al. |
| 7,343,692 B2 | 3/2008 | Gould |
| 7,363,719 B2 | 4/2008 | Levinson et al. |
| 7,392,594 B2 | 7/2008 | Kesler |
| 7,398,600 B2 | 7/2008 | Ming |
| 7,467,475 B1 | 12/2008 | Cheek |
| 7,472,486 B2 | 1/2009 | Tran et al. |
| 7,520,065 B2 | 4/2009 | Vernola |
| 7,536,798 B2 | 5/2009 | Silberberg |
| 7,552,540 B2 | 6/2009 | Ming |
| D598,308 S | 8/2009 | Gofer |
| D598,309 S | 8/2009 | Gofer |
| 7,568,292 B2 | 8/2009 | Maruyama |
| 7,644,506 B2 | 1/2010 | Wong |
| D613,194 S | 4/2010 | Silberberg |
| 7,735,229 B2 | 6/2010 | Allemand |
| 7,802,371 B2 | 9/2010 | Ming |
| 7,827,699 B2 | 11/2010 | Montgomery |
| D628,914 S | 12/2010 | Kim et al. |
| D634,221 S | 3/2011 | Wojciechowski et al. |
| 7,946,045 B2 | 5/2011 | Allemand |
| 8,011,108 B2 | 9/2011 | Upthegrove |
| D646,595 S | 10/2011 | Allemand |
| 8,061,051 B2 | 11/2011 | Allemand |
| 8,336,221 B2 * | 12/2012 | Steele et al. ................ 33/528 |
| 2006/0053563 A1 | 3/2006 | Skinner |
| 2008/0022543 A1 | 1/2008 | Kesler |
| 2008/0222907 A1 | 9/2008 | Silberberg |
| 2008/0271331 A1 | 11/2008 | Allemand |
| 2008/0282562 A1 | 11/2008 | Allemand |
| 2008/0301957 A1 | 12/2008 | Vernola |
| 2009/0158605 A1 | 6/2009 | Montgomery |
| 2010/0005671 A1 | 1/2010 | Hudson et al. |
| 2010/0095543 A1 | 4/2010 | Inthavong |
| 2011/0099823 A1 | 5/2011 | Christianson et al. |
| 2011/0099824 A1 | 5/2011 | Christianson et al. |
| 2011/0119941 A1 | 5/2011 | Steele et al. |
| 2011/0265338 A1 | 11/2011 | Christianson et al. |

FOREIGN PATENT DOCUMENTS

| | | |
|---|---|---|
| GB | 2364950 | 2/2002 |
| JP | 2007331055 | 12/2007 |

OTHER PUBLICATIONS

GB1018187.3, United Kingdom Search and Examination Report dated Nov. 14, 2011, 4 pages.
Australian Examiner's Report for Application No. 2010236055 dated May 15, 2012 (3 pages).
Chinese Office Action for Application No. 2010105256209 dated Mar. 22, 2012 (English Translation and Original, 6 pages).
United Kingdom Search and Examination Report for Application No. 1208193.1 dated Aug. 3, 2012 (5 pages).
United Kingdom Search and Examination Report for Application No. 1208193.1 dated Dec. 3, 2012 (3 pages).
United Kingdom Search Report for Application No. 1018187.3 dated Jan. 19, 2012 (1 page).
"Faithfull Heavy Duty V Pipe Groove 3 Vial Spirit Level," Tooled-up website, <URL: http://www.tooled-up.com/Product.asp-?PID=175072>.
"Sealey PLT115 Deburring Tool," Toolbox website, <URL: http://www.toolbox.co.uk/sealey-plt115-deburring-tool-6984-107443>.
United Kingdom Search Report for Application No. 1018187.3 dated Jan. 23, 2012 (1 page).
United Kingdom Search Report for Application No. 1018187.3 dated Jan. 20, 2012 (1 page).
United States Office Action for U.S. Appl. No. 12/912,443 dated Feb. 14, 2012 (7 pages).
United States Final Rejection for U.S. Appl. No. 12/912,443 dated May 16, 2012 (6 pages).
United States Notice of Allowance for U.S. Appl. No. 12/912,443 dated Aug. 28, 2012 (5 pages).

* cited by examiner

LEVEL

RELATED APPLICATIONS

This application is a continuation of U.S. application Ser. No. 12/912,443 filed Oct. 26, 2010, now U.S. Pat. No. 8,336,221, which claims priority to U.S. Provisional Patent application No. 61/255,357 filed on Oct. 27, 2009, and to U.S. Provisional Patent application No. 61/330,773 filed on May 3, 2010, the entire content of each is incorporated herein by reference.

BACKGROUND

The present invention relates to hand tools used to level a surface, and more particularly to hand tools used to level an electrical device.

SUMMARY

The present invention provides, in one aspect, a level for indicating the orientation of each of a surface, a first electrical device, or a second electrical device. The level includes a first planar surface, a second planar surface, a web, and a vial. The web is coupled to the first planar surface and the second planar surface such that the first planar surface is spaced apart from and is parallel to the second planar surface. The vial has a long axis and contains a liquid and a gas bubble. The vial is coupled to the web such that the long axis is substantially parallel to the first planar surface. A first perimeter is formed as part of the web. The first perimeter is shaped substantially the same as a portion of the first electrical device and sized to engage the portion of the first electrical device such that the vial is operable to indicate the orientation of the first electrical device.

The present invention provides, in another aspect, a level for indicating the orientation of a surface. The level includes a first planar surface, a second planar surface, a web, a vial, and a tube deburring portion. The web is coupled to the first planar surface and the second planar surface such that the first planar surface is spaced apart from and is parallel to the second planar surface. The vial has a long axis and contains a liquid and a gas bubble. The vial is coupled to the web such that the long axis is substantially parallel to the first planar surface. The tube deburring portion is coupled to the web and includes a male conical portion arranged to deburr an inner edge of a tube and a female conical portion arranged to deburr an outer edge of the tube.

The present invention provides, in another aspect, a level for indicating the orientation of a surface. The level includes a first planar surface, a second planar surface, a web, a vial, a slot, and a pair of grooves. The web is coupled to the first planar surface and the second planar surface such that the first planar surface is spaced apart from and is parallel to the second planar surface. The vial has a long axis and contains a liquid and a gas bubble. The vial is coupled to the web such that the long axis is substantially parallel to the first planar surface. The slot extends through the first planar surface and the second planar surface. The pair of grooves includes a first groove through the first planar surface and a second groove through the second planar surface. The pair of grooves is spaced a first distance from the slot to receive an end of a tube having a diameter corresponding to the first distance such that the pair of grooves is operable to form a chamfer on the end of the tube.

In another construction, the invention provides a level for indicating the orientation of a surface. The level includes a first planar surface, a second planar surface, and a web coupled to the first planar surface and the second planar surface such that the first planar surface is spaced apart from and is parallel to the second planar surface. A vial defines a long axis and contains a liquid and a gas bubble. The vial is coupled to the web such that the long axis is substantially parallel to the first planar surface. A tube deburring portion is coupled to the web and includes a male conical portion arranged to deburr an inner edge of a tube and a female conical portion arranged to deburr an outer edge of the tube.

In yet another construction, the invention provides a level for indicating the orientation of a surface, the level includes a first planar surface, a second planar surface, and a web coupled to the first planar surface and the second planar surface such that the first planar surface is spaced apart from and is parallel to the second planar surface. A vial defines a long axis and contains a liquid and a gas bubble. The vial is coupled to the web such that the long axis is substantially parallel to the first planar surface. A conical wall is formed within a circular opening defined by the web. The conical wall supports a first deburring portion operable to deburr an inner surface of a tube and a second deburring portion opposite the first deburring portion and operable to deburr an outer surface of a tube.

In another construction, the invention provides a level for indicating the orientation of a surface. The level includes a first planar surface, a second planar surface, and a web coupled to the first planar surface and the second planar surface such that the first planar surface is spaced apart from and is parallel to the second planar surface. A vial defines a long axis and contains a liquid and a gas bubble. The vial is coupled to the web such that the long axis is substantially parallel to the first planar surface and a slot extends through the first planar surface and the second planar surface. A pair of grooves includes a first groove through the first planar surface and a second groove through the second planar surface. The pair of grooves is spaced a first distance from the slot to receive an end of a tube having a diameter corresponding to the first distance such that the pair of grooves is operable to form a chamfer on the end of the tube.

Other features and aspects of the invention will become apparent by consideration of the following detailed description and accompanying drawings.

Before any constructions of the invention are explained in detail, it is to be understood that the invention is not limited in its application to the details of construction and the arrangement of components set forth in the following description or illustrated in the following drawings. The invention is capable of other constructions and of being practiced or of being carried out in various ways. Also, it is to be understood that the phraseology and terminology used herein is for the purpose of description and should not be regarded as limiting.

DETAILED DESCRIPTION

FIGS. 1-6 and 11-13 illustrate a level 100 for determining whether an object is level to a particular surface or adjusting an object to a level surface. The level 100 may be used to measure and level at different angles, i.e., 0 degrees, 30 degrees, 45 degrees, and 90 degrees. It should be readily apparent that the level may be used by a variety of users and skilled technicians to perform a variety of leveling functions.

Figure 1:
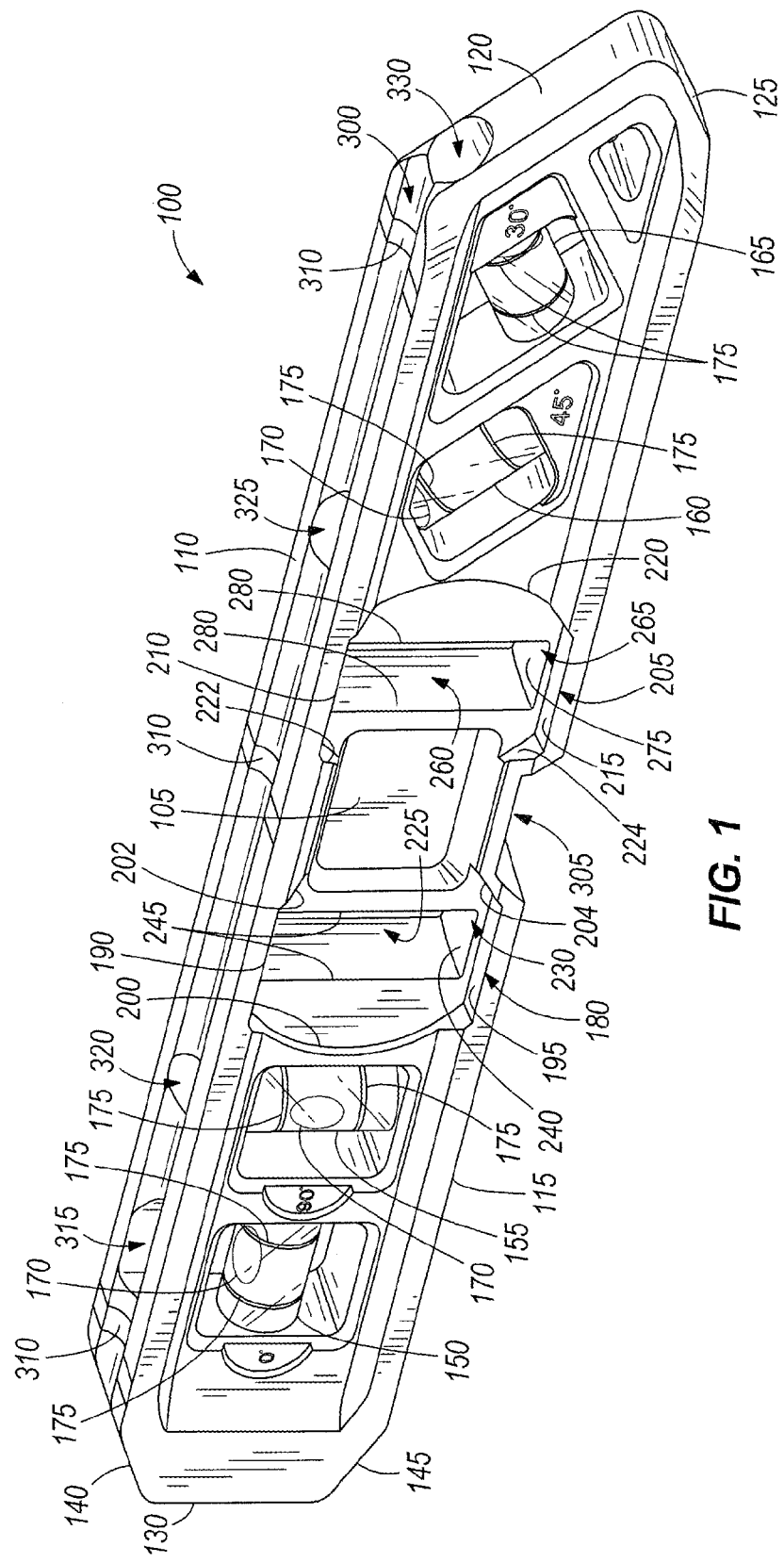
FIG. 1 is a perspective view of a level according to a construction of the invention.
Figure 2:
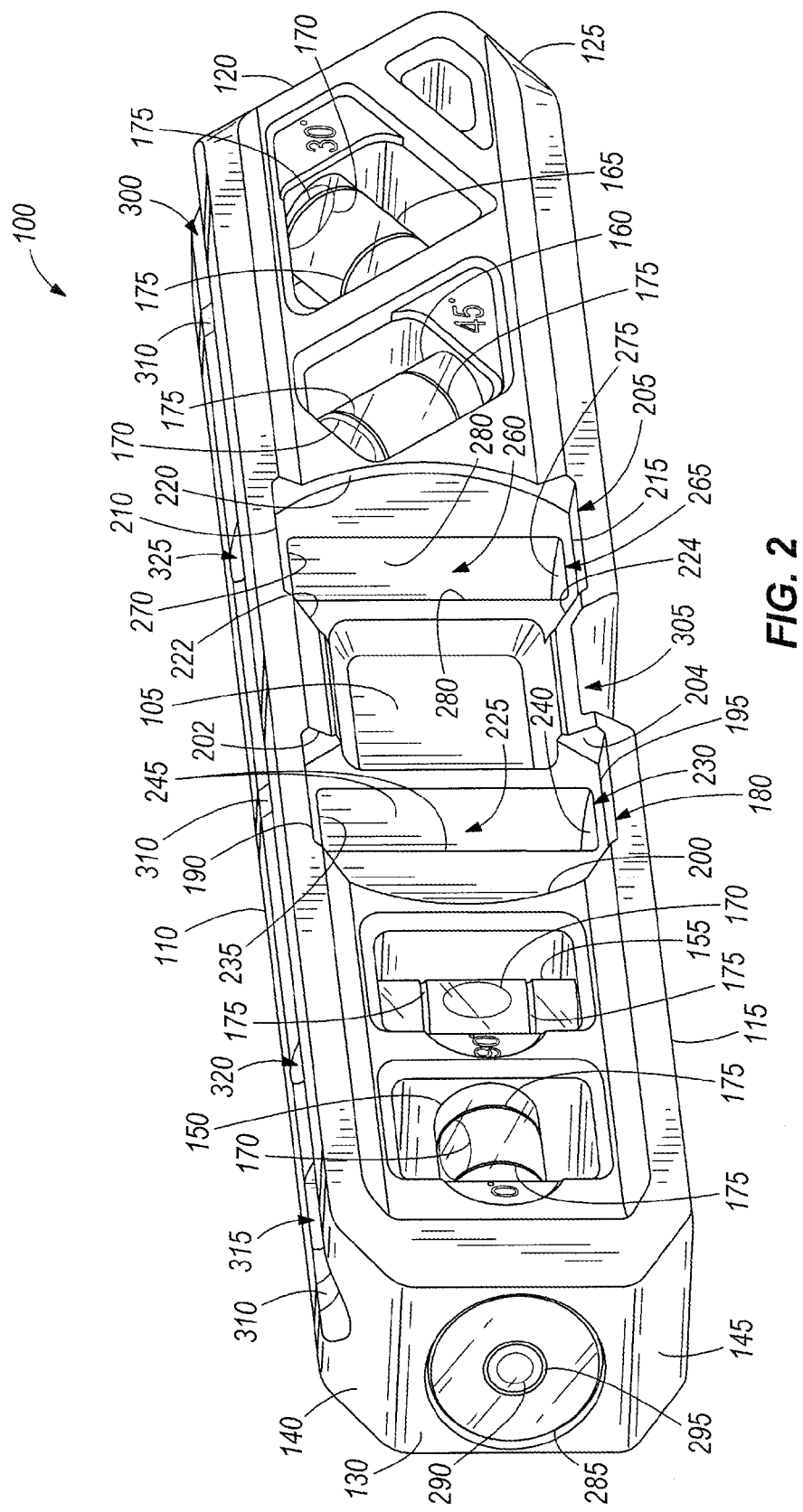
FIG. 2 is another perspective view of the level of FIG. 1.
Figure 3:
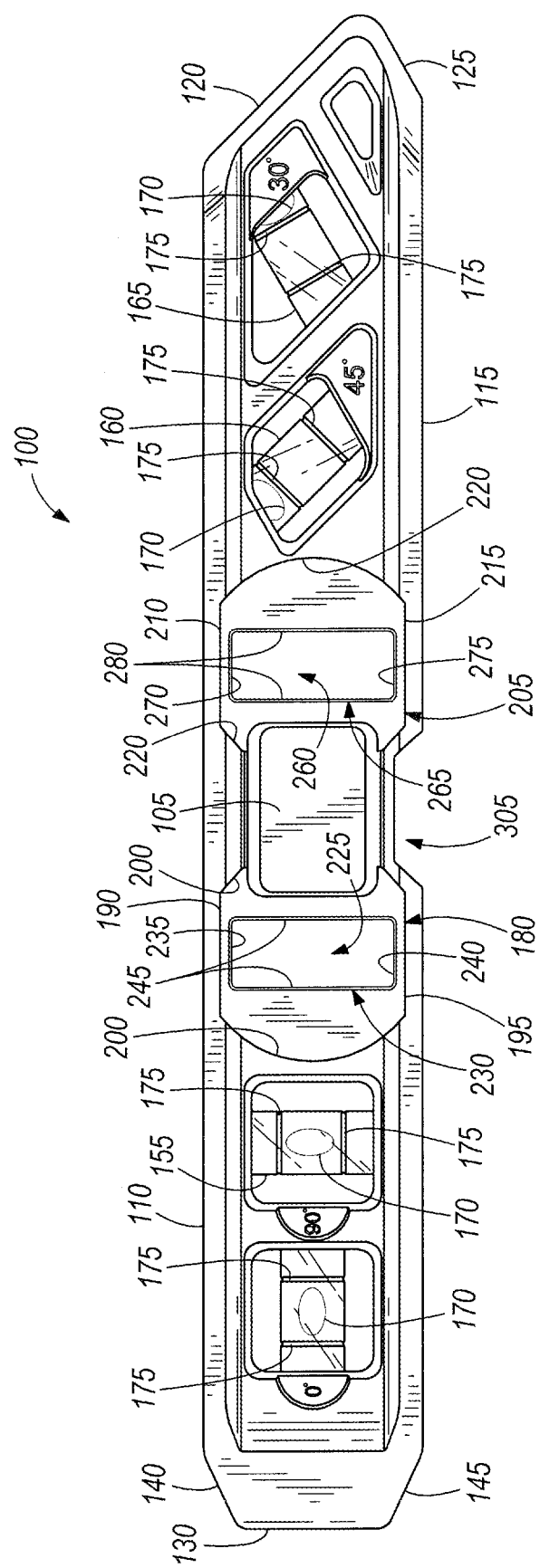
FIG. 3 is a side view of the level shown in FIG. 1.
Figure 4:
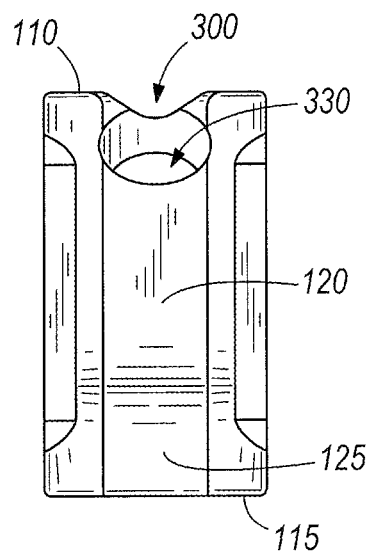
FIG. 4 is a front view of the level shown in FIG. 1.

As shown in FIGS. 1-3, the level 100 includes a web 105 coupled to each of a top planar surface 110, a bottom planar surface 115, a 45-degree planar surface 120, a 30-degree planar surface 125, and a back planar surface 130. The top planar surface 110 is spaced apart from and substantially parallel to the bottom planar surface 115. The 45-degree planar surface 120 is disposed at an included angle of 135 degrees relative to the top planar surface 110. The 30-degree planar surface 125 is disposed at an included angle of 150 degrees relative to the bottom planar surface 115. The back planar surface 130 is substantially perpendicular to the top planar surface 110 and the bottom planar surface 115. The back planar surface 130 is connected to the top planar surface 110 by a first connecting surface 140 and is connected to the bottom planar surface 115 by a second connecting surface 145. The first connecting surface 140 is disposed at an included angle of 135 degrees relative to the top planar surface 110. The second connecting surface 145 is disposed at an included angle of 135 degrees relative to the bottom planar surface 115. Additionally, any of the planar surfaces can include ruler markings for measuring distance.

The web 105 supports a 0-degree vial 150, a 90-degree vial 155, a 45-degree vial 160, and a 30-degree vial 165. The long axis of the 0-degree vial 150 is parallel with the top planar surface 110 and the bottom planar surface 115. The long axis of the 90-degree vial 155 is parallel with the back planar surface 130. The long axis of the 45-degree vial 160 is parallel with the 45-degree planar surface 120. The long axis of the 30-degree vial 165 is parallel with the 30-degree planar surface 125. Each vial contains a liquid, a gas bubble 170, and a series of markings 175. The vials are secured to the web 105 by threaded set screws or other means that hold the vials in place. The threaded set screws inhibit the loosening of the vials over time and also allow for easy replacement of damaged vials. Preferably, the markings 175 are laser etched on the vial and the liquid is colored (e.g., green). Laser-etched markings 175 resist wearing off over time, while the colored liquid improves the visibility of the gas bubble 170 and the markings 175.

As the angle of the level 100 (and therefore the angle of the vial) changes relative to a fixed axis, the gas bubble 170 moves within the vial along the long axis of the vial. Each vial can be used with at least one of the planar surfaces to determine the orientation of a surface or object to be leveled relative to level (i.e., the fixed axis). The position of the gas bubble 170 with respect to the markings 175 allows the user to determine the orientation of the surface or object to be leveled relative to that vial. For example, when the top planar surface 110 engages the surface or object to be leveled, the surface or object to be leveled is level when the gas bubble is centered along the long axis of the 0-degree vial 150.

Figure 7:
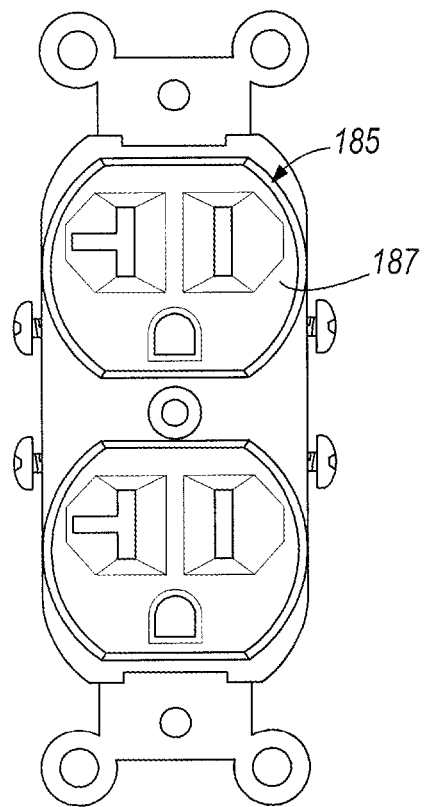
FIG. 7 is a front view of an electrical outlet.

As best shown in FIG. 3, a first electrical outlet perimeter 180 is formed in the web 105. The perimeter 180 is shaped like the perimeter 185 of a standard (120 volt AC) electrical outlet 187, as shown in FIG. 7. The perimeter 180 includes a top portion 190, a bottom portion 195, a first curved side portion 200, and a second curved side portion divided into two segments 202 and 204. The perimeter 180 is sized to engage at least a portion of the perimeter 185 of the electrical outlet 187 when the electrical outlet 187 is inserted within the perimeter 180. When the perimeters 180, 185 are engaged, either the 0-degree vial 150 or the 90-degree vial 155 is used to level the electrical outlet 187. Alternatively, the perimeter 180 is configured to accommodate the leveling of differently shaped electrical outlets, for example, those configured for use with different voltages or for use in other countries. The perimeter 180 allows the user to level the electrical outlet 187 without attaching a face plate to the electrical outlet 187.

Figure 6:
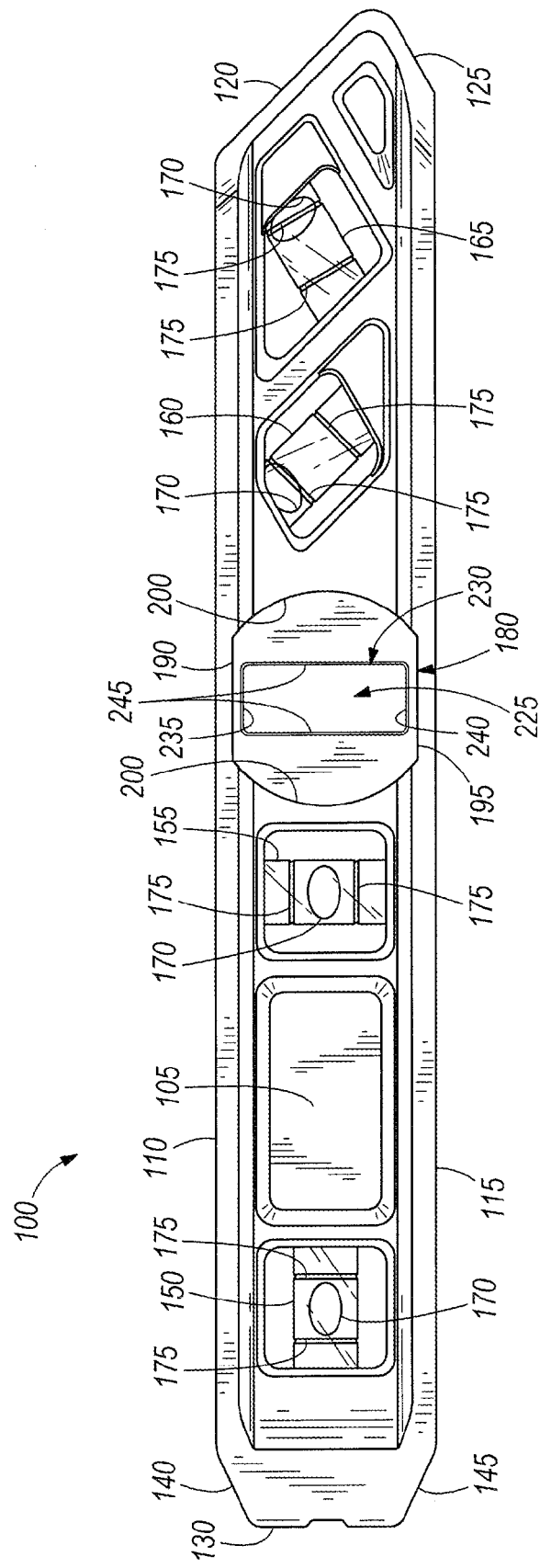
FIG. 6 is a side view of an alternative of the level shown in FIG. 1.

A second electrical outlet perimeter 205, identical to the first perimeter 180, is formed in the web 105. The second perimeter 205 includes a top portion 210, a bottom portion 215, a first curved side portion 220, and a second curved side portion divided into two segments 222 and 224. The second perimeter 205 is spaced from the first perimeter 180 so that the two perimeters 180, 205 are separated by the standard spacing between a pair of side-by-side electrical outlets. In this way, the two perimeters 180, 205 can be used to level a pair of side-by-side electrical outlets. Alternatively, as shown in FIG. 6, the level 100 only includes one electrical outlet perimeter 180. The perimeters 180 and 205 can be formed on either side of the web 105.

Figure 8:
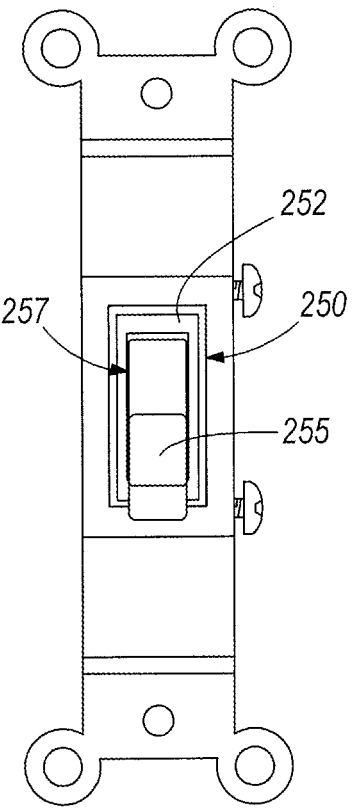
FIG. 8 is a front view of a light switch.

A first light switch aperture 225 is formed through the web 105. The aperture 225 is positioned within the perimeter 180. The aperture 225 forms a third perimeter 230 that includes a top portion 235, a bottom portion 240, and two side portions 245. The perimeter 230 is shaped like the perimeter 250 of a housing 252 of a standard light switch 255, as shown in FIG. 8. The perimeter 230 is sized to engage at least a portion of the perimeter 250 when the housing 252 and the switch 255 are inserted into the aperture 225. When the perimeters 230, 250 are engaged, either the 0-degree vial 150 or the 90-degree vial 155 is used to level the housing 252 and the switch 255. Alternatively, the perimeter 205 is sized to engage the perimeter 257 of the switch 255. In other alternatives, the aperture 225 and the perimeter 230 are configured to accommodate the leveling of different types of switches, for example, slidable dimmer switches.

Figure 9:
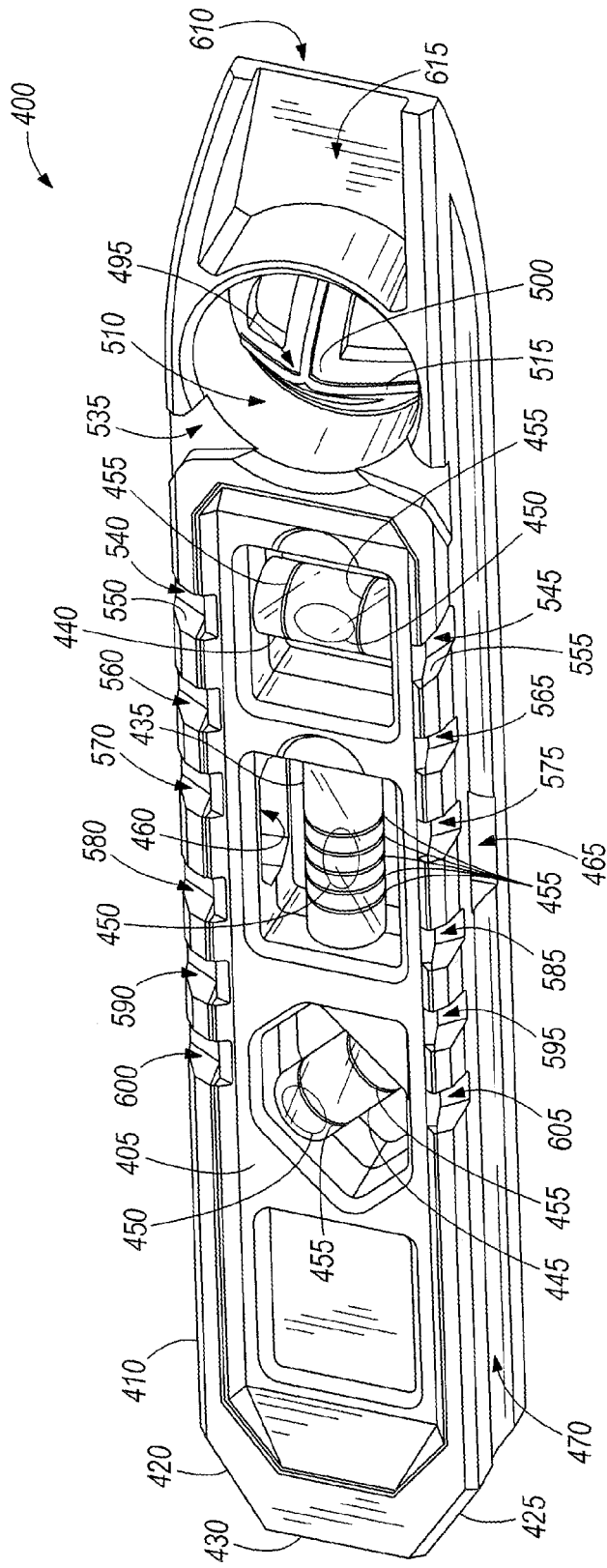
FIG. 9 is perspective view of a level according to another construction of the invention.

A second light switch aperture 260, identical to the first aperture 225, is formed through the web 105. The aperture 260 is positioned within the perimeter 205. The aperture 260 forms a fourth perimeter 265 that includes a top portion 270, a bottom portion 275, and two side portions 280. The second aperture 260 is spaced from the first aperture 225 so that the two apertures 225, 260 are separated by the standard spacing between a pair of side-by-side light switches. In this way, the perimeters 230, 265 of the apertures 225, 260 can be used to level a pair of side-by-side light switches. Alternatively, as shown in FIG. 9, the level 100 only includes one light switch aperture 225.

Figure 5:
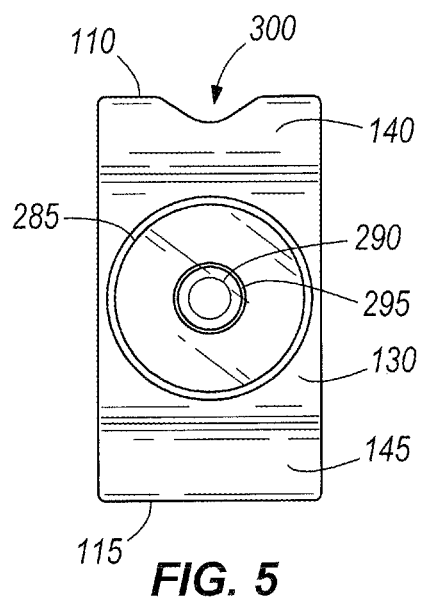
FIG. 5 is a rear view of the level shown in FIG. 1.

As shown in FIGS. 2 and 5, the back planar surface 130 supports a circular or bull's-eye vial 285. The bull's-eye vial 285 contains a liquid, a gas bubble 290, and at least one marking 295, similar to those already described. The bull's eye vial 285 is used to level a surface or object to be leveled in two directions, where the two directions are perpendicular to each other and the two directions are perpendicular to the planar surface engaging the surface or object to be leveled. As the angle of the level 100 (and therefore the angle of the bull's-eye vial 285) changes, the gas bubble 290 moves within the vial towards or away from the center point of the bull's eye vial 285. The surface or object to be leveled is level with respect to the two directions when the gas bubble 290 is centered within the bull's-eye vial 285. The bull's-eye vial 285 is particularly useful for leveling a drain stack. The bull's-eye vial 285 is secured to the back planar surface 130 using arrangements similar to those already discussed and preferably by threaded set screws.

As shown in FIGS. 1 and 2, the top planar surface 110 includes a channel 300 extending along the length of the top planar surface 110. The channel 300 is curved so the top planar surface 110 can engage a tube, pipe, or other rounded surface for leveling. Alternatively, the channel 300 is notched or V-shaped for engaging a rounded surface for leveling. In other alternatives, the top planar surface 110 is flat. The bottom planar surface 115 includes a notch 305 extending into the web 105. The notch 305 is sized to provide clearance for a seam or other protrusion on the surface or object to be leveled. For example, a vent pipe frequently has a seam that makes it difficult to place the bottom planar surface 115 on the vent pipe. The notch 305 allows the bottom planar surface 115 to be used to level the vent pipe by providing clearance between the bottom planar surface 115 and the seam. Alternatively, the bottom planar surface 115 includes a channel 300 similar to the top planar surface 110. When both the top planar surface 110 and the bottom planar surface 115 include a depression, the two depressions can be sized such that each depression accommodates a rounded surface of a different diameter.

As shown in FIGS. 1 and 2, the top planar surface 110 can include magnets 310 that allow the level to be magnetically attached to a surface or object to be leveled. As shown, the magnets 310 are exposed. Alternatively, the magnets 310 are embedded in the top planar surface 110 (i.e., covered and hidden from view). Preferably, the magnets 310 are neodymium magnets; however, other rare earth or non-rare earth magnets can be also be used. Alternatively, the magnets 310 are supported by the web 105 or other surfaces of the level 100.

As shown in FIG. 1, the top planar surface 110 includes three apertures 315, 320, and 325 extending into the web 105. The apertures 315, 320, and 325 allow the user to view the 0-degree vial 150, the 90-degree vial 155, and the 45-degree vial 160, respectively, through the top planar surface 110. The 30-degree planar surface 125 includes an aperture 330 extending into the web 105 that allows the user to view the 30-degree vial 165 through the 30-degree planar surface.

In the illustrated construction, the level 100 has a length of about 9.50 inches, a thickness of about 0.75 inches, and a height of about 1.375 inches. The features of the illustrated construction may be adapted for use in constructions of the level where the level has a greater or a lesser length, width or height. The level 100 can be constructed from aluminum, steel, plastic, or other suitable material. In addition, other features not discussed could be included on the level 100 or some features discussed could be omitted from the level 100.

Figure 10:
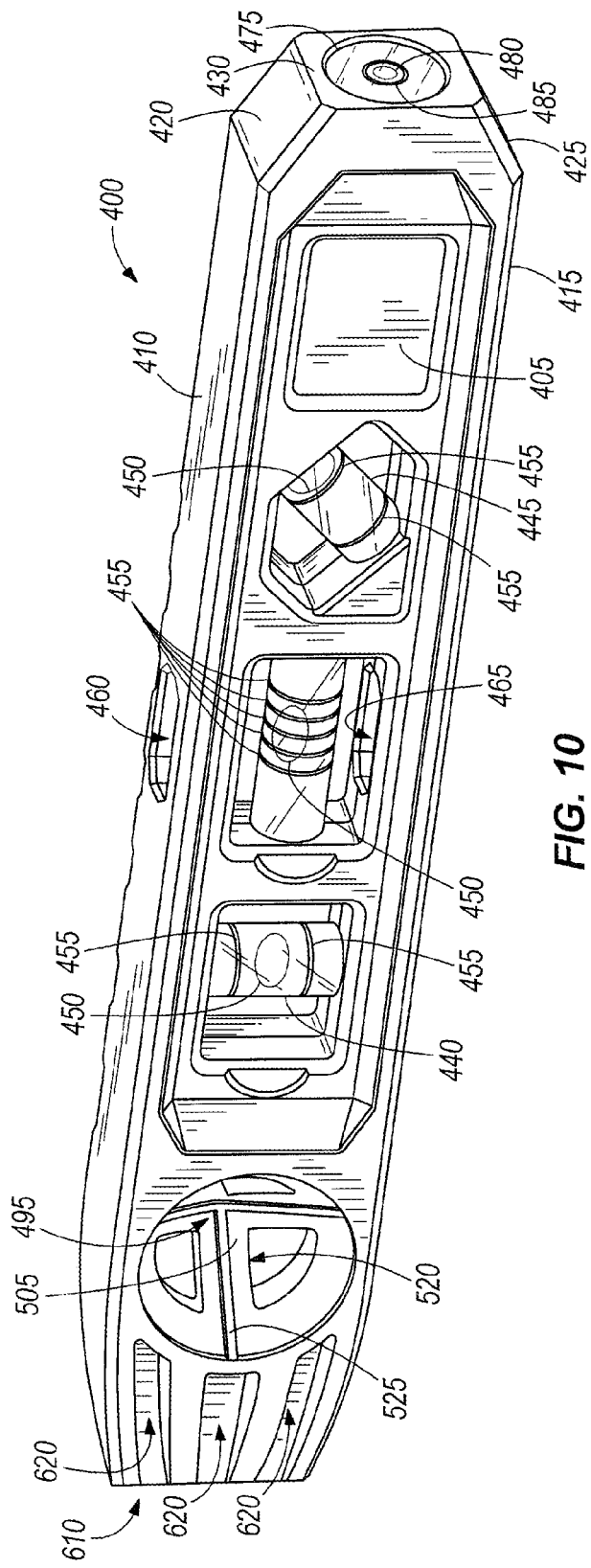
FIG. 10 is another perspective view of the level shown in FIG. 9.

FIGS. 9 and 10 illustrate another construction of a level 400. The level 400 includes many of the same features and characteristics of the level 100 shown in FIGS. 1-5. Reference is made to the description of the level 100 for additional characteristics and variations of the level 400. The following description presents additional characteristics and features of the level 400.

As shown in FIGS. 9 and 10, the level 400 includes a web 405 coupled to each of a top planar surface 410, a bottom planar surface 415, a first 45-degree planar surface 420, a second 45-degree planar surface 425, and a back planar surface 430. The top planar surface 410 is spaced apart from and substantially parallel to the bottom planar surface 415. The first 45-degree planar surface 420 is disposed at an included angle of 135 degrees relative to the top planar surface 410 and the second 45-degree planar surface 425 is disposed at an included angle of 135 degrees relative to the bottom planar surface 415. The back planar surface 430 is substantially perpendicular to the top planar surface 410 and the bottom planar surface 415. The back planar surface 430 is connected to the top planar surface 410 by the first 45-degree planar surface 420 and is connected to the bottom planar surface 415 by the second 45-degree planar surface 425.

The web 405 supports a 0-degree vial 435, a 90-degree vial 440, and a 45-degree vial 445, in much the same way as was described with regard to the construction of FIGS. 1-6. The long axis of the 0-degree vial 435 is parallel with the top planar surface 410 and the bottom planar surface 415. The long axis of the 90-degree vial 440 is parallel with the back planar surface 430. The long axis of the 45-degree vial 440 is parallel with the second 45-degree planar surface 425. Each vial contains a liquid, a gas bubble 450, and a series of markings 455.

In some constructions, the 0-degree vial 435, and/or other vials, is a slope gradient vial 435. The slope gradient vial 435 includes a series of slope markings 455 that indicate one-quarter inch, one-eighth inch, and one-sixteenth inch slopes relative to the top planar surface 410 or the bottom planar surface 415. In other alternatives, an integrated shim is included with the slope gradient vial 435 to adjust the longitudinal axis of the vial 435 to the appropriate slope relative to the top planar surface 410 or the bottom planar surface 415.

As shown in FIG. 10, the top planar surface 410 includes an aperture 460 extending into the web 405. As shown in FIG. 9, the bottom planar surface 415 includes an aperture 465 extending into the web 405. The apertures 460 and 465 allow the user to view the vial 435 through the top planar surface 410 and the bottom planar surface 415, respectively. The bottom planar surface 415 includes a channel 470 extending along the length of the bottom planar surface 415. The channel 470 is curved so the bottom planar surface 415 can engage a tube, pipe, or other rounded surface for leveling. Alternatively, the channel 470 is notched or V-shaped for engaging a rounded surface for leveling.

As shown in FIG. 10, the back planar surface 430 supports a circular or bull's-eye vial 475, similar to the one already discussed. The bull's-eye vial 475 contains a liquid, a gas bubble 480, and at least one marking 485.

As shown in FIGS. 9-10 and 12-13, a deburring tool 495 is coupled to or formed as part of the web 405. The deburring tool 495 includes a cylindrical aperture with a conical member disposed near one end and extending towards the opposite end of the cylindrical aperture. The deburring tool 495 includes a male side 500 (FIG. 9) and a female side 505 (FIG. 10). An aperture 510 extends into first side of the web 405 and provides access to the male side 500 of the deburring tool 495. The male side 500 includes at least one cutting surface or blade 515 and is arranged to deburr the inside of a tube (e.g., a pipe). To use the male side 500 to deburr the inside of a tube, the tube is inserted into the aperture 510 so that the end of the tube contacts the male side 500. The tube or level 400 is then twisted about the long axis of the tube while in contact with the male side 500 so that the blade 515 cuts away any burrs found on the inside of the tube. An aperture 520 extends into the second side of the web 405 and provides access to the female side 505 of the deburring tool 495. The female side 505 includes at least one cutting surface or blade 525 and is arranged to deburr the outside of a tube. To use the female side 505 to deburr the outside of a tube, the tube is inserted into the aperture 520 so that the end of the tube contacts the female side 505. The tube or level 400 is then twisted about the long axis of the tube while in contact with the female side 505 so that the blade 525 cuts away any burrs found on the outside of the tube. The conical shape of the deburring tool 495 allows both sides 500 and 505 of the deburring tool to be used on tubes of differing diameters. Preferably, the deburring tool 495 is sized to accommodate pipe up to one-inch in diameter, with larger or smaller sizes being possible. The deburring tool 495 is suitable for use with metal pipe or plastic pipe.

Figure 11:
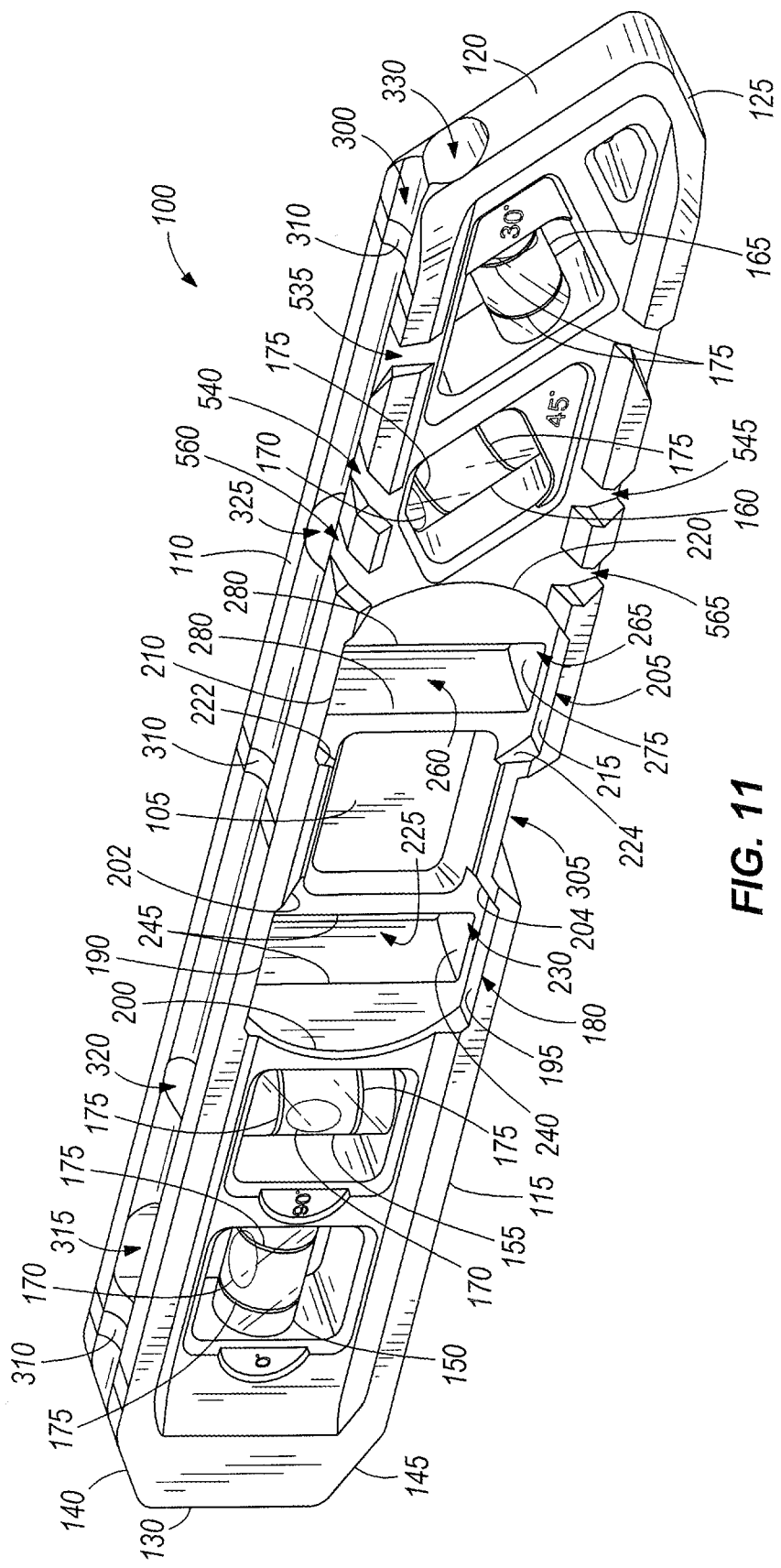
FIG. 11 is a perspective view of a level according to another construction of the invention.
Figure 12:
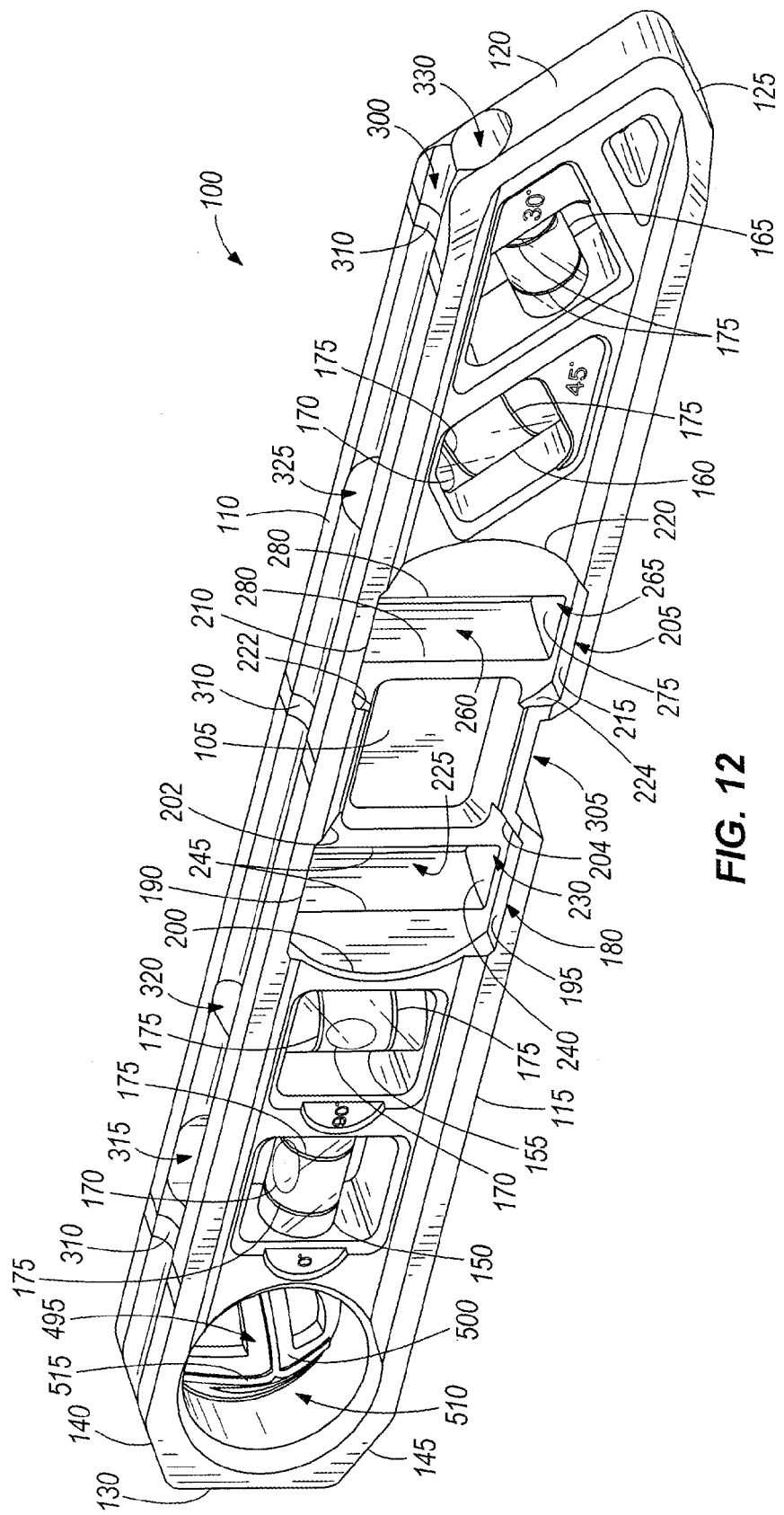
FIG. 12 is a perspective view of a level according to another construction of the invention.
Figure 13:
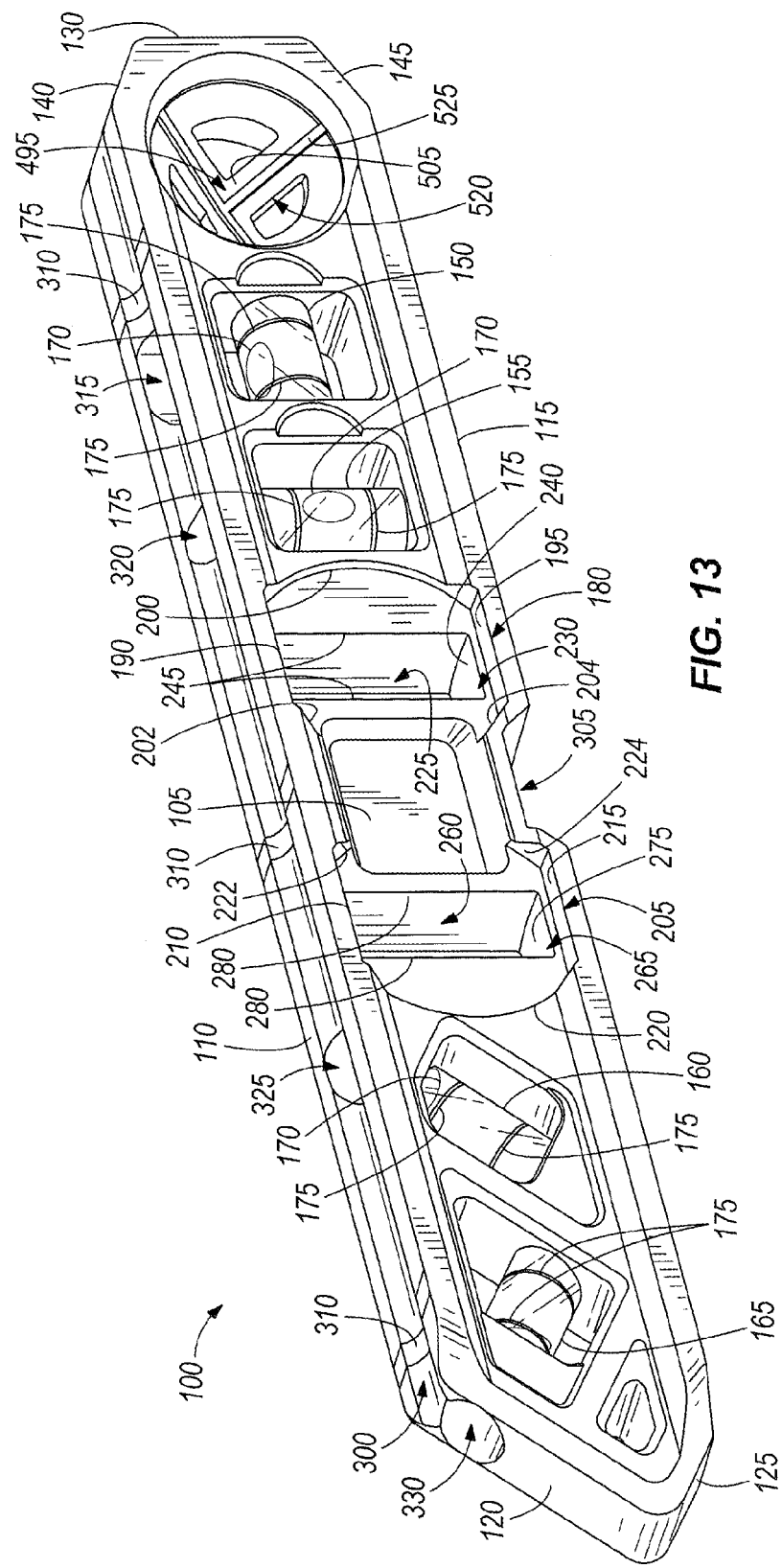
FIG. 13 is another perspective view of the level shown in FIG. 12.

As shown in FIGS. 9 and 11, a chamfering tool 530 is formed by a slot 535 and at least one pair of grooves 540 and 545. The slot 535 extends across the web 405 and through the top planar surface 410 and the bottom planar surface 415. The first pair of grooves includes a first groove 540 through the top planar surface 410 and a second groove 545 through the bottom planar surface 415. The first groove 540 forms a first cutting face 550 and the second groove 545 forms a second cutting face 555. The pair of grooves 540 and 545 is spaced a set distance apart from the slot 535. The set distance corresponds to the diameter of a tube to be chamfered. The slot 535 and the pair of grooves 540 and 545 cooperate to chamfer the end of the tube. The end of the tube is inserted into the slot 535 and the first pair of grooves 540 and 545. The tube or level 400 is then twisted about the long axis of the tube so that the cutting faces 550 and 555 cut a chamfer into the end of the tube. Additional pairs of grooves 560 and 565, 570 and 575, 580 and 585, 590 and 595, 600 and 605, similar to the first pair of grooves 540 and 545, are provided to allow the user to chamfer tubes of different diameters. Preferably, tubes of up to four inches in diameter can be chamfered. A pair of grooves and the corresponding cutting faces can be configured to create an inside chamfer, an outside chamfer, or both on the end of a tube.

A shovel 610 is formed in the web 405 by a depression 615 formed in a first side of the web 405 (FIG. 9) and three slots 620 formed in a second side of the web 405 (FIG. 10). The shovel 610 can be used to dig or clear debris from a work area as required.

Various features of the invention are set forth in the following claims.

What is claimed is:

1. A level for indicating the orientation of a surface, the level comprising:
    a first planar surface;
    a second planar surface;
    a web coupled to the first planar surface and the second planar surface such that the first planar surface is spaced apart from and is parallel to the second planar surface;
    a vial having a long axis and containing a liquid and a gas bubble, the vial coupled to the web such that the long axis is substantially parallel to the first planar surface;
    a tube deburring portion coupled to the web and including a male conical portion arranged to deburr an inner edge of a tube and a female conical portion arranged to deburr an outer edge of the tube; and
    a first blade coupled to the male conical portion and a second blade coupled to the female conical portion.

2. The level of claim 1, wherein the tube deburring portion includes a cylindrical wall that extends through the web to define a cylindrical aperture, the male conical portion and the female conical portion disposed substantially within the cylindrical aperture.

3. The level of claim 1, further comprising a slot that extends through the first planar surface and the second planar surface and a first pair of grooves including a first groove that extends through the first planar surface and a second groove that extends through the second planar surface, the first pair of grooves spaced a first distance from the slot, the first distance sized to receive an end of a first tube having a first diameter in the pair of grooves and the slot simultaneously, the pair of grooves operable to chamfer the end of the first tube.

4. The level of claim 3, wherein the first pair of grooves is one of a plurality of pairs of grooves, and wherein each of the pair of grooves is sized to receive an end of a tube having a diameter different than the first diameter to chamfer the end of the tube.

5. The level of claim 3, further comprising a first perimeter formed as part of the web, the first perimeter shaped to engage a surface of a first electrical device to indicate the orientation of the first electrical device.

6. The level of claim 5, further comprising a second perimeter formed as part of the web, the second perimeter shaped to engage a surface of a second electrical device different than the first electrical device to indicate the orientation of the second electrical device.

7. The level of claim 1, wherein the web includes a depression at a first end arranged to define a shovel.

8. A level for indicating the orientation of a surface, the level comprising:
    a first planar surface;
    a second planar surface;
    a web coupled to the first planar surface and the second planar surface such that the first planar surface is spaced apart from and is parallel to the second planar surface;
    a vial having a long axis and containing a liquid and a gas bubble, the vial coupled to the web such that the long axis is substantially parallel to the first planar surface; and
    a conical wall formed within a circular opening defined by the web, the conical wall supporting a first deburring portion operable to deburr an inner surface of a tube and a second deburring portion opposite the first deburring portion and operable to deburr an outer surface of the tube.

9. The level of claim 8, wherein the first deburring portion includes a male conical portion and the second deburring portion includes a female conical portion disposed substantially within the circular opening.

10. The level of claim 9, further comprising a first blade coupled to the male conical portion and a second blade coupled to the female conical portion.

11. The level of claim 8, further comprising a slot that extends through the first planar surface and the second planar surface and a first pair of grooves including a first groove that extends through the first planar surface and a second groove that extends through the second planar surface, the first pair of grooves spaced a first distance from the slot, the first distance sized to receive an end of a first tube having a first diameter in the pair of grooves and the slot simultaneously, the pair of grooves operable to chamfer the end of the first tube.

12. The level of claim 11, wherein the first pair of grooves is one of a plurality of pairs of grooves, and wherein each of the pair of grooves is sized to receive an end of a tube having a diameter different than the first diameter to chamfer the end of the tube.

13. The level of claim 8, wherein the web includes a depression at a first end arranged to define a shovel.

14. A level for indicating the orientation of a surface, the level comprising:
- a first planar surface;
- a second planar surface;
- a web coupled to the first planar surface and the second planar surface such that the first planar surface is spaced apart from and is parallel to the second planar surface;
- a vial having a long axis and containing a liquid and a gas bubble, the vial coupled to the web such that the long axis is substantially parallel to the first planar surface;
- a slot extending through the first planar surface and the second planar surface; and
- a pair of grooves including a first groove through the first planar surface and a second groove through the second planar surface, the pair of grooves spaced a first distance from the slot to receive an end of a tube having a diameter corresponding to the first distance such that the pair of grooves is operable to form a chamfer on the end of the tube, wherein the first groove includes a first cutting face and the second groove includes a second cutting face.

15. The level of claim 14, further comprising a second pair of grooves including a third groove through the first planar surface and a fourth groove through the second planar surface, the second pair of grooves spaced a second distance from the slot to receive an end of a second tube having a diameter corresponding to the second distance such that the second pair of grooves is operable to form a chamfer on the end of the second tube.

16. The level of claim 14, further comprising a tube deburring portion coupled to the web and including a male conical portion arranged to deburr an inner edge of the tube and a female conical portion arranged to deburr an outer edge of the tube.

17. The level of claim 16, further comprising a first blade coupled to the male conical portion and a second blade coupled to the female conical portion.

18. The level of claim 17, wherein the tube deburring portion includes a cylindrical wall that extends through the web to define a cylindrical aperture, the male conical portion and the female conical portion disposed substantially within the cylindrical aperture.

19. The level of claim 17, further comprising a perimeter formed as part of the web, the perimeter shaped to engage a surface of an electrical device to indicate the orientation of the electrical device.

20. The level of claim 14, wherein the pair of grooves is one of a plurality of pairs of grooves, and wherein each of the pair of grooves is sized to receive an end of a tube and is spaced a different distance from the slot than any of the other pair of grooves to accommodate and deburr an equal plurality of tubes each having different diameters.

21. The level of claim 14, wherein the web includes a depression at a first end arranged to define a shovel.

\* \* \* \* \*